United States Patent
Cui et al.

(10) Patent No.: US 7,849,182 B2
(45) Date of Patent: Dec. 7, 2010

(54) BLADE SERVER

(75) Inventors: Jishun Cui, Beijing (CN); Jian Zhang, Beijing (CN); Xun Huang, Beijing (CN)

(73) Assignees: Lenovo (Beijing) Limited, Beijing (CN); Legend Holdings Ltd., Beijing (CN)

( * ) Notice: Subject to any disclaimer, the term of this patent is extended or adjusted under 35 U.S.C. 154(b) by 143 days.

(21) Appl. No.: 12/264,394

(22) Filed: Nov. 4, 2008

(65) Prior Publication Data

US 2009/0144567 A1 Jun. 4, 2009

(30) Foreign Application Priority Data

Nov. 6, 2007 (CN) .................. 2007 1 0176883

(51) Int. Cl.
G06F 13/00 (2006.01)
G06F 15/16 (2006.01)

(52) U.S. Cl. .............. 709/223; 709/224; 709/228; 710/2; 710/8

(58) Field of Classification Search ........... 709/203, 709/224, 228; 710/2; 370/474
See application file for complete search history.

(56) References Cited

U.S. PATENT DOCUMENTS

| | | | |
|---|---|---|---|
| 7,032,037 B2 * | 4/2006 | Garnett et al. ........... | 710/2 |
| 2002/0080821 A1 * | 6/2002 | Hwang ................. | 370/474 |
| 2007/0237071 A1 * | 10/2007 | Chiasson et al. ........ | 370/217 |
| 2008/0148093 A1 * | 6/2008 | Lee ..................... | 714/4 |

* cited by examiner

Primary Examiner—Khanh Q Dinh
(74) Attorney, Agent, or Firm—Patterson Thuente Christensen Pedersen, P.A.

(57) ABSTRACT

A blade server that includes at least two data processing modules for receiving data and processing the received data; an exchange backboard for achieving data exchange between the data processing modules, and also for achieving data exchange between each of the data processing modules and an interconnection module; the interconnection module for achieving connection and high-speed data exchange between the data processing modules; an I/O interface module for achieving a connection between the blade server and an external network; and a management and control module for controlling the switching between the data processing modules and also for monitoring and managing the blade server. The blade server unites multiple networks such as a high-speed network, an Ethernet, a KVM network and a management network, reduces the cost for high-speed exchange, and reduces the delay for network exchange.

8 Claims, 4 Drawing Sheets

BLADE SERVER

RELATED APPLICATION

The present application claims priority to Chinese Application No. 200710176883.1 filed Nov. 6, 2007, which is incorporated herein in its entirety by reference.

FIELD OF THE INVENTION

The present invention relates to the computer field, more particularly, to a blade server.

BACKGROUND OF THE INVENTION

A prior art blade server comprises a plurality of blade-type data processing modules (referred to as "blades" for short), a power supply module for supplying power to the whole system, fans for cooling the system, and a network connecting module for exchanging data with the external.

The configuration of the prior art blade server is shown in FIG. 1. Several blades may be inserted into one backboard. During calculation with high performance, it is necessary to insert an exchange card (such as InifiniBand (IB) network sub-card) in each blade, and then to connect to a high-speed switch through a straight-through module or directly connect to the high-speed switch.

The blade server further comprises an Ethernet interface. The Ethernet interface is independent of the high-speed network interface. The Ethernets of the respective blades are connected to the external environment through an Ethernet switch.

The blade server further comprises a management and monitoring network for managing and controlling the blades. A board management controller (BMC) in the respective blade is connected to a management module (MM), which is also an individual network. The major function of the BMC is to monitor (temperature, voltage, and the like, for example) the key components of the blade. The BMC is also used to achieve the functions of starting up, shutting down and network switching of the blade. The function of the management module is to manage and control the whole blade.

The backboard is a portion located in the middle of the blade server. On one hand, the backboard is used to fix the blades and other modules; on the other hand, the backboard is used to connect connection signals of the respective blades to the other modules.

Each blade is an individual computer unit, comprising a central processing unit (CPU), a memory, a chipset and an I/O chipset (such as hard disk interface, network interface and the like). When there is an Ethernet interaction between the blades, the Ethernet of blade 1 is switched by the externally connected Ethernet switch through the backboard, and then arrives at the Ethernet of blade n through the backboard again. In the case of high-speed network exchange, signals from the CPU and memory of blade 1 arrives at the backboard through the I/O chipset and the high-speed network sub-card, and then arrive at the externally connected high-speed switch through the straight-through module connected to the backboard. After the data exchange is completed, the signals return to the high-speed network sub-card, the I/O chipset, and then to the memory and the CPU of blade n through the backboard. Data exchange between any blades is achieved by the externally connected switch module or switch.

KVM is an abbreviation for Keyboard, Video and Mouse, and is used to manage the video switching of the system. The blade server comprises a plurality of blades, each of which may have different operating system installed. When switching to view the KVM of the respective blade, the switching of the KVM network is carried out by the management module. The KVM network is an individual network, which is separate from the high-speed network, the Ethernet, and the management and monitoring network. It is not a structure of a united multi-network.

From the above, it can be seen that the problems existing in the current blade server are: there are a plurality of networks, such as the high-speed network, the Ethernet, the KVM network, the management network, and the like; the cost for the high-speed exchange is high, because in the high-speed network, there must be the high-speed network sub-cards inserted in the respective blades, the high-speed switch device connected outside the server, and thus a large amount of connecting cables for connecting the devices; and the delay of the network exchange is great, which has a significant influence on the computing performance, because in the current structure, the exchange between the blades is carried out in the external switch, and thus the network delay is great.

SUMMARY OF THE INVENTION

In view of the problems existing in the prior art blade server, such as high cost for high-speed exchange and large exchange delay, the present invention provides a novel blade server.

A blade server according to an embodiment of the present invention comprises: at least two data processing modules, for receiving data and processing the data; an exchange backboard, for achieving data exchange between the at least two data processing modules, and also for achieving data exchange between the at least two data processing modules and an interconnection module; the interconnection module, for achieving data exchange between each of the at least two data processing modules and the interconnection module through the exchange backboard; an I/O interface module, for achieving a connection between the blade server and an external network; and a management and control module for controlling the switching between the at least two data processing modules, and also for monitoring and managing the blade server.

The blade server according to an embodiment of the present invention may further comprise: a system power source module for supplying power to the blade server; and a system cooling module for controlling the temperature of the internal running environment of the blade server.

In an embodiment, the data processing module comprises at least one central processing unit for processing the data by an operating system running in a memory unit; the memory unit for running the operating system, said operating system being called in from the external network by the data processing module and processing the received data; and an interconnection controller, for achieving data exchange between the central processing unit and the exchange backboard, and also for achieving data exchange between the memory unit and the exchange backboard.

In an embodiment, the exchange backboard comprises at least two exchange chips, wherein there are redundant network signal connections between the at least two exchange chips and also between the at least two exchange chips and the data processing modules. Particularly, the data processing module comprises at least two ports connected to the different exchange chips, respectively.

In an embodiment, the data processing module may further comprise a management unit for managing the data processing module and exchanging data with the management and control module through the interconnection controller and the exchange backboard. The connection between the data processing module and the exchange backboard may be a high-speed serial connection. Further, the connection between the exchange backboard and the interconnection module may be a multi-port connection.

The present invention embodiments achieves uniting of multiple networks, such as a high-speed network, an Ethernet a KVM network and a management network, by achieving high-speed data exchange between the blade-type data processing modules in the high-speed exchange backboard, setting the I/O module, the high-speed interconnection module and the management and control module shared by a plurality of blade-type data processing modules, reduces the cost for high-speed exchange and reduces the delay for network exchange.

BRIEF DESCRIPTION OF THE DRAWINGS

The figures illustrated here are intended to provide further understanding of the present invention, and constitute one part of the present application. The exemplary embodiments of the present invention and the illustrations thereof are provided to explain the present invention, not to improperly limit the scope of the present invention. In the figures.

DETAILED DESCRIPTION OF THE DRAWINGS

Figure 1:
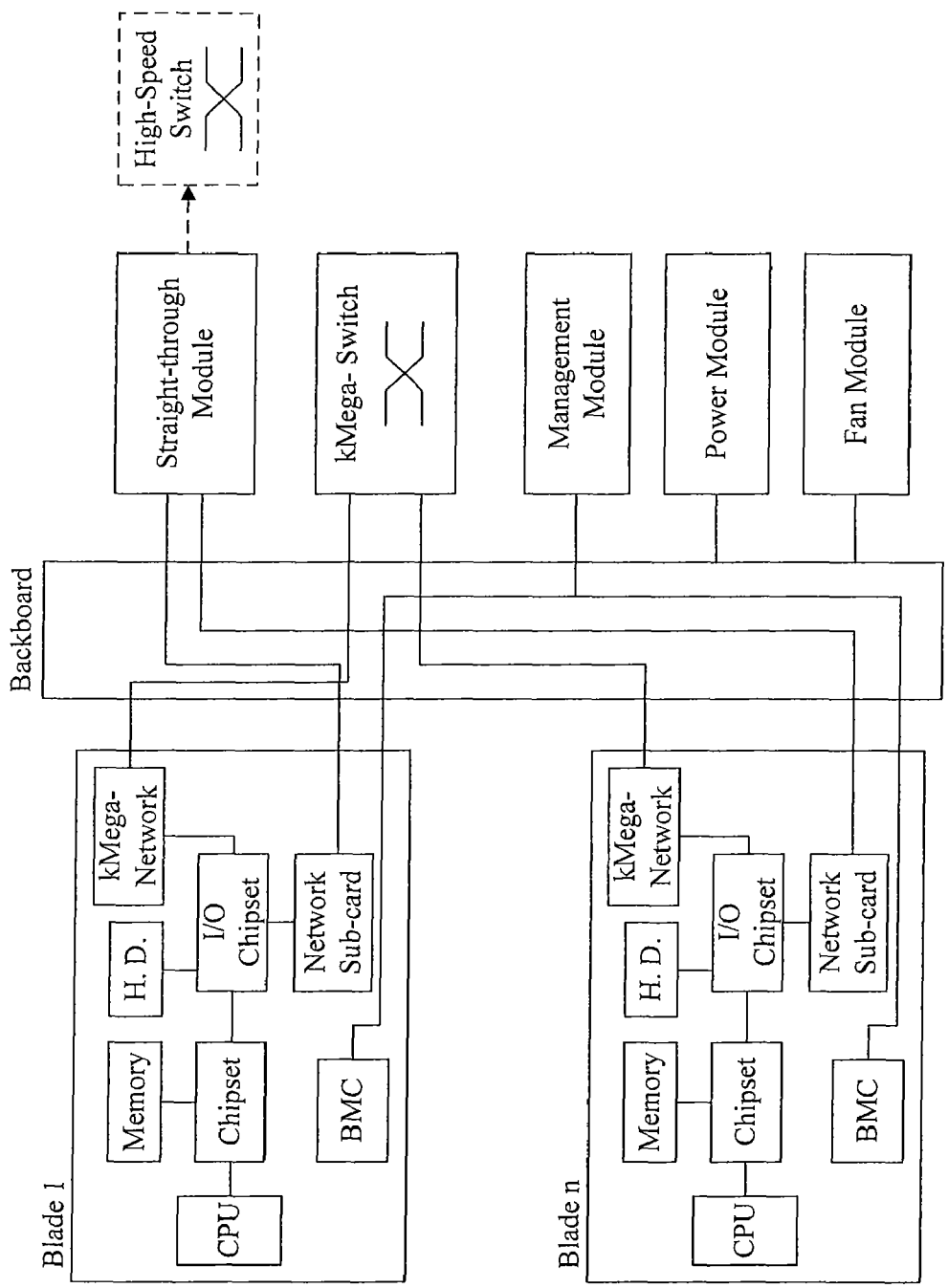
FIG. 1 is a structure block diagram showing a blade server in the prior art.

Now, embodiments of the present invention will be described by referring to the drawings.

Figure 2:
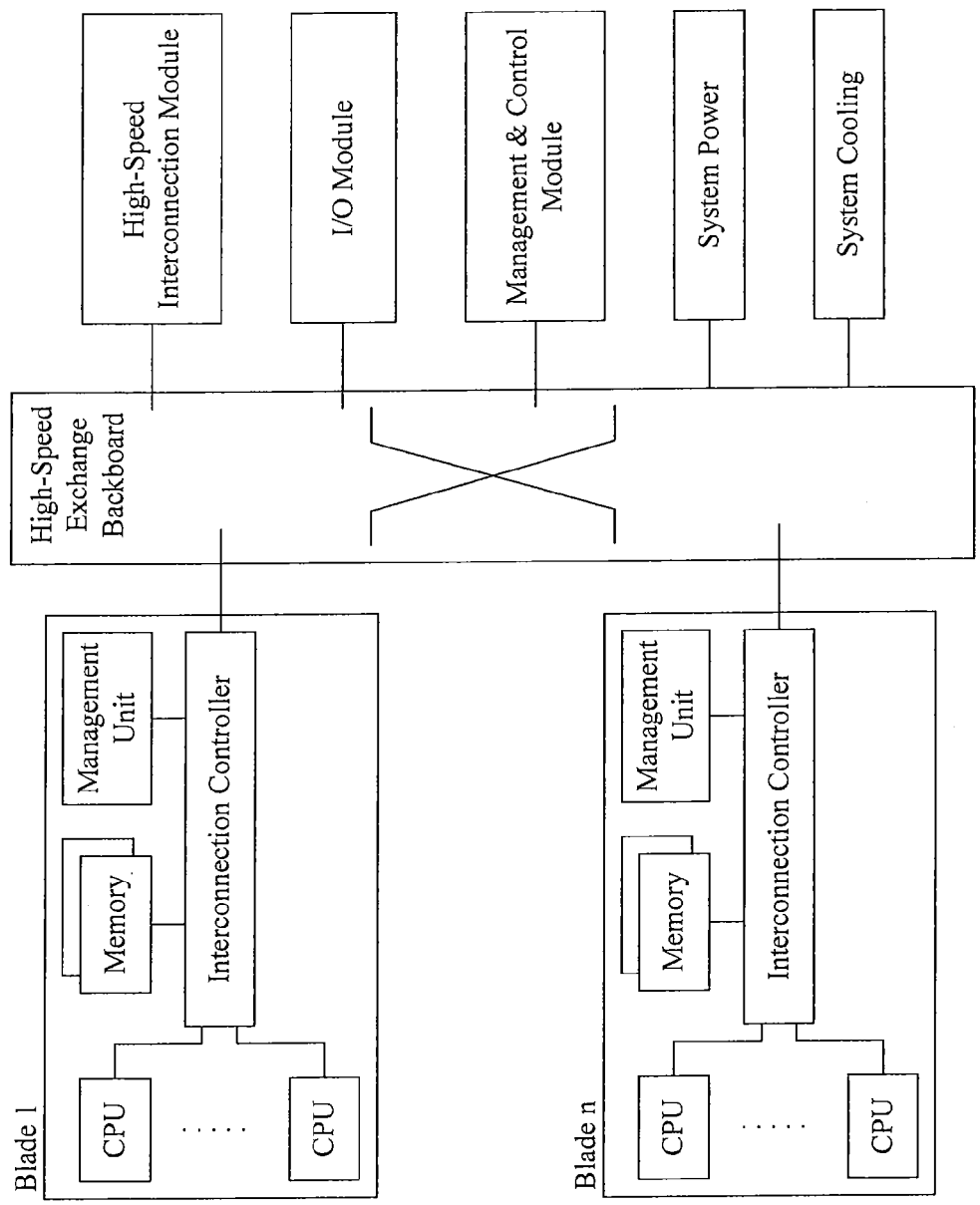
FIG. 2 is a structure block diagram showing a blade server according to an embodiment of the present invention.

Referring to FIG. 2, a blade server according to an embodiment of the present invention will be illustrated. As shown in FIG. 2, the blade server comprises: blades for receiving data and processing the received data; a high-speed exchange backboard, for achieving high-speed data exchange between the blades and also for achieving high-speed data exchange between the blades and a high-speed interconnection module; the high-speed interconnection module, for achieving connection and high-speed data exchange between blade servers; an I/O interface module, for achieving connection between the blade server and an external network; and a management and control module for controlling the switching of keyboard, video and mouse between the blades and also for monitoring and managing the blade server; a system power source module for supplying power to the blade server; and a system cooling module for controlling the temperature of the internal running environment of the blade server.

It can be seen from FIG. 2 that the blade according to an embodiment of the present invention only comprises CPU(s), a memory, a management unit and an interconnection controller. As compared with the blade structure of the prior art, the blade according to an embodiment of the present invention does not comprise a hard disk and an I/O chipset (of course, the blade according to another embodiment of the present invention may also comprise a hard disk and an I/O chipset).

The high-speed exchange backboard according to an embodiment of the present invention is used to achieve the function of network exchange between the blades. The backboard of the prior art is only used to achieve signal connections, rather than network exchange. Furthermore, the exchange between the blades is achieved directly through the high-speed exchange backboard; the exchange between different blade servers is achieved through the high-speed interconnection module; and the connection between the blade server and the external network (such as Ethernet, storage network) is achieved through the I/O module.

Particularly, within one blade, all the hardware such as the management network, the CPU(s) and the memory is connected to the interconnection controller, and the interconnection controller is used to achieve unification of these data, including unification of connections and protocols of the hardware signals. The interconnection controller achieves connections of the CPU(s), the memory and the management unit to the high-speed exchange backboard by converting the data from the CPU(s), the memory and the management unit into that conforming to a high-speed serial communication protocol, thereby achieving information exchange with the other blades. In the physical level, there are no Ethernet, high-speed network, and KVM network in one individual blade, and the transmission for such information is performed in a unified data transmission mode by the interconnection controller. When an external Ethernet accesses the blade server, the data conversion between the Ethernet and the internal of the blades is achieved through the I/O module. When an external KVM accesses the blade server, the data conversion is achieved through the management module. The data exchange of the high-speed network communication within the blade server is achieved through the high-speed exchange backboard, and the high-speed data exchange between the blades is achieved through the high-speed interconnection module. Therefore, from the point of the physical structure, a plurality of networks are merged into one network, and there is not interconnection among the plurality of networks within the blade server in the physical level. Furthermore, the data signals of different types differ from each other in the protocol level, which are communications of data in the bottom level. To achieve a high bandwidth and a low delay of transmission between the blades and the high-speed exchange backboard, the connection between the interconnection controllers of the blades and the high-speed exchange backboard is a high-speed serial multi-channel communication.

Furthermore, because there is no hard disk in the blade, the blade should boot the operating system directly form the network and call in the operating system to run in the memory. The configuration without a hard disk reduces the problem of stop of the system due to the fault of the hard disk.

Furthermore, the communicating process between the blades is shown as follows: the data from the CPU and the memory of blade 1, converted through the interconnection controller, and then exchanged through the high-speed exchange backboard, arrives at the interconnection controller, CPU and the memory of blade n, thereby achieving the purpose of data exchange. Since the data exchange between the blades is performed directly through the high-speed exchange backboard rather than an external switch, the time for data transmission is reduced and thus the network delay during the calculation with high performance is very low, thereby improving the performance of the calculation. Furthermore, only the high-speed connection between the blade servers is achieved by the high-speed interconnection module.

Figure 3:
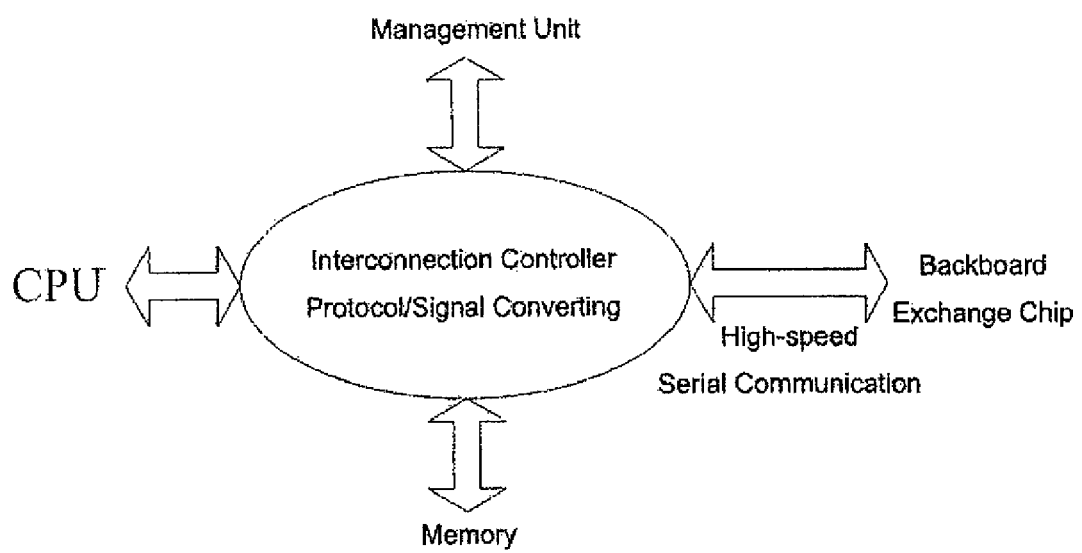
FIG. 3 is a schematic view showing an interface of an interconnection controller in the blade server according to an embodiment of the present invention.

As shown in FIG. 3, the physical interface of the interconnection controller may comprise, but not limited to, interfaces to the CPU(s), the memory, the management unit and the high-speed exchange backboard.

The physical interface between the interconnection controller and the backboard exchange chip is a single-channel, or multi-channel, bidirectional full-duplex communication interface. The communication protocol is in a high-speed, serial communication manner. Each of the physical communication channels may have several logical channels to achieve the multi-channel high-speed data transmission, thereby achieving the communication between the CPU(s), the memory and the management unit in the blade and the backboard exchange chip.

The conversion of data protocols for different device data types is performed in the protocol layer of the interconnection controller, mainly including the conversion of the data exchange protocols between the CPU(s), the memory and the management unit and the backboard exchange chip. With the example of transmission of the memory data, the conversion process of data protocols is illustrated as follows: the data path from the backboard exchange chip to the interconnection controller is in a high-speed serial protocol; the interconnection controller parses and then buffers the data to achieve data exchange with the memory, which is a standard reading and writing process for the memory data. Other data is processed in a similar manner, and different data types have different data-type identifiers in the protocols when exchanging data with the backboard-exchange chip. The interconnection controller achieves the conversion of the communication signals and protocols between different devices.

Figure 4:
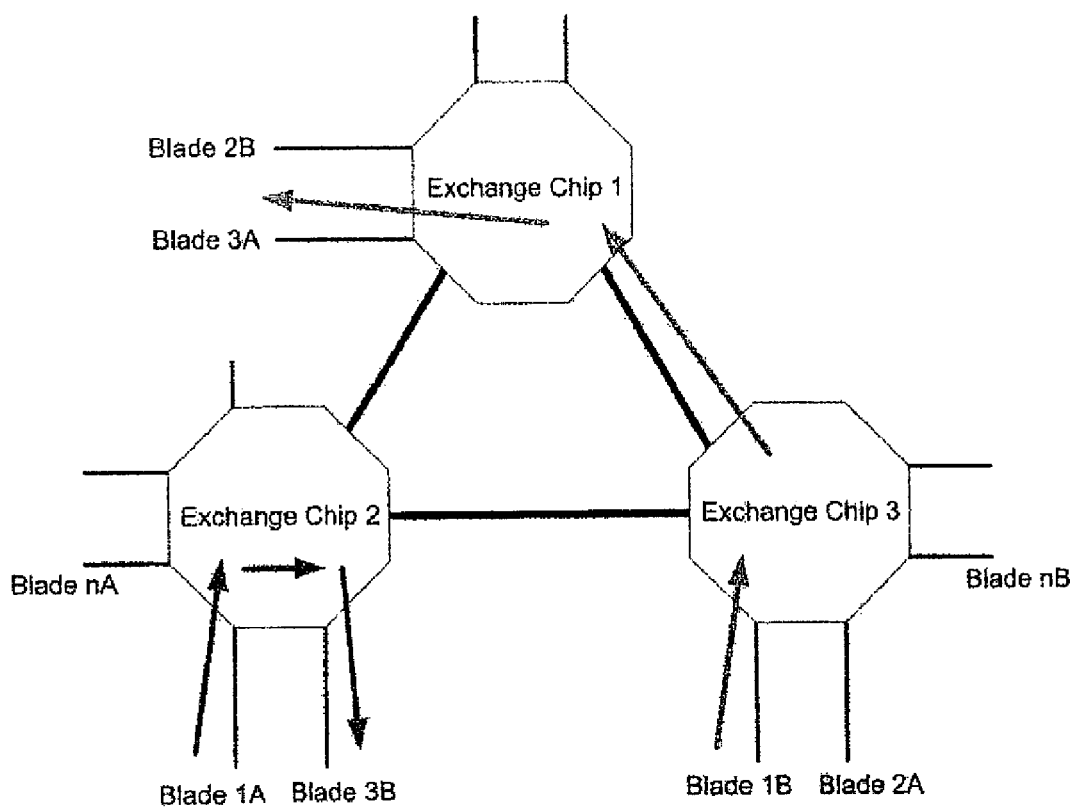
FIG. 4 is a schematic view showing the internal structure of a high-speed exchange backboard of the blade server according to an embodiment of the present invention.

As shown in FIG. 4, the high-speed exchange backboard according to the embodiment of the present invention may comprise three network exchange chips 1, 2, 3 for connecting all the blades. There are redundant network signal connections between the respective blades and the high-speed exchange backboard. For example, blade 1 has two ports which are redundant with respect to each other, blade 1A and blade 1B, for connecting to different network chips respectively. If one port of the blade is down, the other port will take over the network exchange function. The three exchange chips 1, 2, 3 of the high-speed exchange backboard are interconnected, and further the blade ports and the high-speed chips are cross-connected. That is, if blade port 1A is connected to chip 2, then port 1B is connected to chip 3; if blade port 2A is connected to chip 3, then port 2B is connected to chip 1; and if blade port 3A is connected to chip 1, then port 3B is connected to chip 2. Further, the exchange chips of the high-speed exchange backboard are redundantly connected. Specifically, there are high-speed connection paths between the exchange chips. If one exchange chip is down, the other two exchange chips will also be able to connect to the network, and thus the communication network between the blades will not be completely down. The redundant design and connection improve the reliability of the connections significantly. Further, the connection between the high-speed interconnection module and the respective exchange chips of the high-speed exchange backboard is a two-port connection, as shown by the dashed line in FIG. 4. When a communication is carried out between the blades, the system will automatically select a shortest exchange path.

Specifically, the communication process between the network-exchange chips is illustrated from a perspective of data exchange. There is a communication link table within each network-exchange chip, which records the link relationships between the blades and the network-exchange chip. When the data is exchanged from one blade to another blade, the network exchange chip will parse the source address and the destination address from the exchanged data, find the shortest exchange path from the link table, and then send the data to the destination address.

For example, as shown in FIG. 4, blade 1 has two redundant interfaces 1A and 1B and blade 3 has two redundant interfaces 3A and 3B. When blade 1 exchanges data with blade 3, if all the interfaces and the network exchange chips are fault-free, there are the following data exchange paths between blade 1 and blade 3:

1) blade 1A→exchange chip 2→blade 3B;
2) blade 1A→exchange chip 2→exchange chip 1→blade 3A;
3) blade 1B→exchange chip 3→exchange chip 1→blade 3A; and
4) blade 1B→exchange chip 3→exchange chip 2→blade 3B.

The network exchange chips will automatically select the shortest link of "blade 1A→exchange chip 2→blade 3B" to achieve the data exchange and communication.

If network-exchange chip 2 is down, the possible link for blade 1 and blade 3 to achieve data exchange is the link of "blade 1B→exchange chip 3→exchange chip 1→blade 3A", which can also achieve the data exchange.

If interface 1A of blade 1 is down, the possible link for blade 1 and blade 3 to achieve data exchange comprises the following links of:

1) blade 1B→exchange chip 3→exchange chip 1→blade 3A; and
2) blade 1B→exchange chip 3→exchange chip 2→blade 3B.

The two possible transmitting links have identical length. In such case, the system achieves exchange according to the order of A first and then B, that is, achieves data exchange by employing the link of "blade 1B→exchange chip 3→exchange chip 1→blade 3A".

If interface 1A of blade 1 and interface 3B of blade 3 both are down, the possible exchange link for blade 1 and blade 3 to achieve data exchange is the link of "blade 1B exchange chip 3→exchange chip 1→blade 3A".

It can be seen from the above that the system has reliability due to redundancy. When an interface of one blade or two different blades is down, or one exchange chip is down, the system can normally operate to exchange data. Only in case of both of the chips and the interfaces being down, the data exchange between some blades in the system cannot be performed and the data exchange only can be normally performed between the exchange chips and the blades connected to the interfaces in good condition.

The KVM viewing and switching between the blades is achieved by the management and control module. The whole blade system is managed and controlled by the management and control module. The management unit in the blade achieves exchange with the management and control module through the network. The management and control module achieves monitoring on the blade by collecting the information from the management unit. For the control information, the management and control module sends the control information to the management unit of the blade through the network, and controls the blade via the management unit.

To conclude, in the present invention, the high-speed backboard is built-in inside the blade server and all the connecting lines are achieved by the circuit board, so the reliability is much higher. (A conventional switch must be installed outside the blade server and is connected via external dedicated connecting cables. The reliability is low, and there is transmission delay due to the length of the lines, affecting the transmission performance.)

Furthermore, the high-speed backboard according to an embodiment of the present invention achieves redundancy for exchange and connection. Whether one of the lines connected with the blades is down or one of the exchange chips is down, it will not affect the data exchange of the system. A conventional switch does not have such function. Once one of the exchange chips within the switch is down, the system connected with the switch cannot carry out exchanging. Further, the interfaces connected with the switch cannot achieve redundancy.

However, in the high-speed backboard according to an embodiment of the present invention, the function of the switch is not simply transplanted into the backboard. Their implementations and functions are significantly different. The high-speed backboard is a product directed to the blade server and various aspects of the system such as structure and interface closely fit the blade and the devices within the blade server. However, the switch usually is a general, standard product.

The above describes several embodiments of the present invention, and is not intended to limit the scope of the present invention. For those skilled in the art, various modifications and changes may be made. The modifications, equivalent substitutions and improvements without departing from the spirit and scope of the present invention should fall into the scope defined by the following claims.

What is claimed is:

1. A blade server, comprising:
   at least two blade data processing units adapted to receive data and process the data, each of the data processing units including a respective an interconnection controller;
   an exchange backboard, wherein each of the data processing units exchanges data with the exchange backboard through its respective interconnection controller in accordance with a high-speed serial communication protocol, and the exchange backboard is operable to route the data from one of the data from one of the data processing units to another one of the data processing units;
   an interconnection unit coupled to said at least two data processing units through said exchange backboard so as to exchange data with each of the at least two data processing units through the exchange backboard, wherein the interconnection unit is operable to interconnect with a further blade server for exchanging data between said blade server and said further blade server;
   an I/O interface unit coupled to said at least two data processing units through the exchange backboard so as to exchange data with each of said at least two data processing units through the exchange backboard, wherein the I/O interface unit is operable to interconnect with an external network so as to exchange data between the blade server and the external network; and
   a management and control unit coupled to said at least two data processing units through the exchange backboard so as to exchange data with each of said at least two data processing units through the exchange backboard, wherein the management and control unit is operable to control the switching between said at least two data processing units, and also to monitor and manage said blade server.

2. The blade server according to claim 1, wherein, said exchange backboard comprises at least two exchange chips, wherein there are redundant network signal connections between said at least two exchange chips and also between said at least two exchange chips and said data processing units.

3. The blade server according to claim 2, wherein said data processing unit comprises at least two ports connected to the different exchange chips respectively.

4. The blade server according to claim 3, wherein said data processing unit further comprises:
   at least one central processing unit operable to process the received data by an operating system running in a memory unit; and
   said memory unit operable to run the operating system, said operating system being called in from said external network by said data processing unit and processing the data;
   wherein said central processing unit and said memory unit respectively exchange data with said exchange backboard, through the interconnection controller.

5. The blade server according to claim 4, wherein said data processing unit further comprises a management unit operable to manage said data processing unit and exchange data with said management and control unit through said interconnection controller and said exchange backboard.

6. The blade server according to claim 1, wherein the connection between said exchange backboard and said interconnection unit is a multi-port connection.

7. The blade server according to claim 6, further comprising:
   a system cooling unit operable to control the temperature of the internal running environment of said blade server.

8. The blade server according to claim 7, further comprising:
   a system power source unit for supplying power to said blade server.

* * * * *